May 26, 1925.

W. T. ROSS

LOCK NUT

Filed March 25, 1924

1,539,513

Inventor
Walter T. Ross.

By Albert E. Dieterich
Attorney

Patented May 26, 1925.

1,539,513

UNITED STATES PATENT OFFICE.

WALTER T. ROSS, OF VANCOUVER, BRITISH COLUMBIA, CANADA.

LOCK NUT.

Application filed March 25, 1924. Serial No. 701,794.

*To all whom it may concern:*

Be it known that I, WALTER T. Ross, citizen of the Dominion of Canada, residing at Vancouver, in the Province of British Columbia, Canada, have invented certain new and useful Improvements in Lock Nuts, of which the following is a specification.

This invention relates to a lock nut designed to effectively secure a nut on the threaded end of a bolt or screw.

The invention is particularly described in the following specification, reference being made to the drawings by which it is accompanied, in which.

Figure 1:
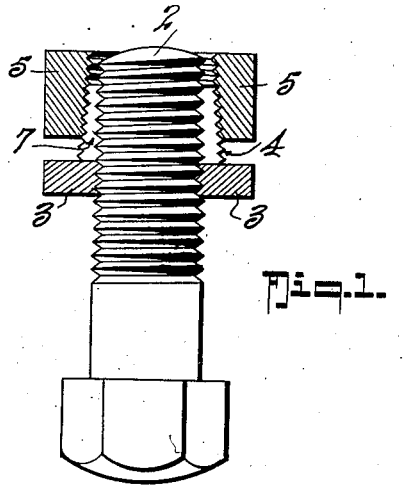
Fig. 1 is an elevation of a bolt with the locking nuts in section.
Figure 4:
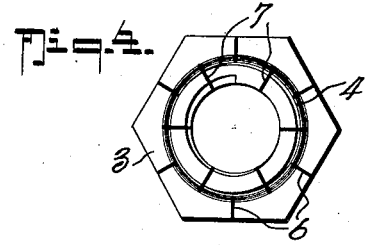
Fig. 4 is a plan of the upper side of the same.
Figure 2:
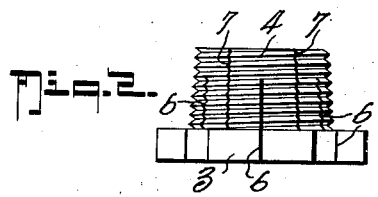
Fig. 2 is an elevation of the bolt nut, the locking nut being removed.
Figure 3:
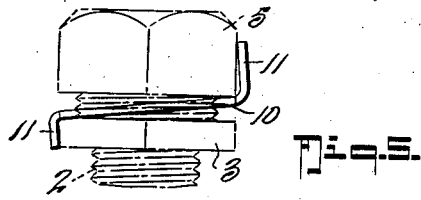
Fig. 3 is a plan of the underside of the bolt nut.

In these drawings 2 represents the threaded end of a bolt, 3 is the nut internally threaded to fit the thread of the bolt. The outer end of this nut 3 is conically threaded as at 4, preferably with a finer thread to receive a conically bored and threaded locking nut 5.

The conical portion 4 of the bolt nut 3 has a series of radial saw cuts 7 extending from the smaller end of the cone to the shouldered connection of the cone to the polygonal portion of the nut 3, that is, through approximately three-quarters of the depth of the nut and intermediate these cuts 7 similar radial cuts 6 are made through the polygonal end of the nut 3 and through the greater part of the length of the conical portion 4 but terminate about a quarter of the length of the nut from that end.

These cuts 6 and 7 from opposite ends of the nut 3, 4 provide an ample measure of inward flexibility to the nut segments, and this flexibility is from both ends of the cone 4, so that when the locking nut 5 is forcibly screwed on the conical portion 4 of the nut 3, the segments of that nut are radially contracted inward on the screw 2, and by virtue of the incline of the screw thread and the taper of the cone and the free flexibility of the segments inward the nut can be secured on the thread with a very powerful grip.

Figure 5:
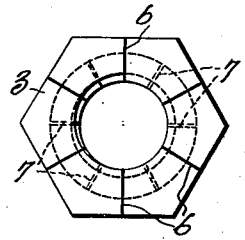
Figs. 5 and 6 show the application of a supplementary safeguard washer in elevation and plan.
Figure 6:
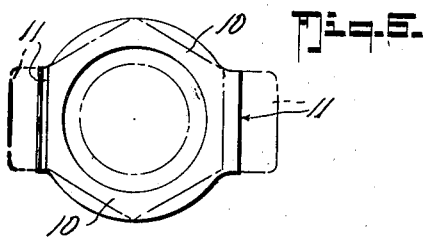

As a further safeguard where it is considered necessary, a washer 10 may be applied, see Figs. 5 and 6, between the polygonal head of the nut 3, and the nut 5 said washer having portions 11 that may be turned one way to engage the flats of 3 and in the other way to engage the flats of 5, thereby preventing the nut 5 slacking off the conical portion 4 of the bolt nut.

Having now particularly described my invention, I hereby declare that what I claim as new and desire to be protected in by Letters Patent, is:

1. A nut lock, comprising a nut member threaded internally to fit the bolt and radially slit from each end to adjacent the other end, and means for compressing the several slit segments of the nut member on the thread of the bolt.

2. A nut lock, comprising a nut member threaded internally to fit the bolt and having an externally threaded portion, said nut member having a series of radial slits from each end to adjacent the other end and a securing nut threaded to fit the external thread of the bolt nut and contract the segments thereof on the thread of the bolt.

3. A nut lock comprising a nut member threaded internally to fit the bolt and having an external conical threaded portion, said nut member radially slit from each end to adjacent the other end, and a securing nut adapted to fit the conical thread of the aforesaid bolt nut member.

In testimony whereof I affix my signature.

WALTER T. ROSS.